United States Patent [19]

Reisgies et al.

[11] Patent Number: 4,951,608
[45] Date of Patent: Aug. 28, 1990

[54] BRISKET BAR APPARATUS FOR CONTROLLING THE POSITIONING AND MOVEMENT OF COWS IN A MILKING PARLOR

[76] Inventors: Rolf W. Reisgies, 3 Arbor Ct.; Larry G. Larson, 107 Kingston Way, both of Waunakee, Wis. 53597; Jay Crolius, R.D. 3-30, Booneville, N.Y. 11309

[21] Appl. No.: 352,164

[22] Filed: May 15, 1989

[51] Int. Cl.⁵ .............................................. A01K 1/12
[52] U.S. Cl. ................................ 119/14.03; 119/147.1
[58] Field of Search ............... 119/14.01, 14.03, 14.04, 119/96, 147.1

[56] References Cited

U.S. PATENT DOCUMENTS 4,508,059  4/1985  Anderson ........................ 119/14.03
4,763,605  8/1988  Braun ............................. 119/14.03

FOREIGN PATENT DOCUMENTS 7802256  9/1979  Netherlands .................... 119/14.03
1186172  10/1985  U.S.S.R. ......................... 119/14.03

Primary Examiner—John Weiss
Attorney, Agent, or Firm—Lathrop & Clark

[57] ABSTRACT

The position and movement of cows in a herringbone type milking parlors is controlled with a brisket bar apparatus having a barrier which extends along the length of the milking parlor at the height of the brisket of the cows to hold the cows in their proper position within the milking parlor during the milking operation. The brisket bar barrier can be formed of sheet metal having sloped surfaces facing the cows so that no sharp edges or corners are presented to the cows on which the cows could be injured, and to make it difficult for the cows to obtain a foothold to try to climb over the brisket bar barrier. The brisket bar barrier is mounted between vertical support posts on swinging channel members that allow the barrier to be driven a selected distance inwardly toward the cows after they have entered the milking parlor to urge the cows into the proper alignment. After milking is completed, the brisket bar barrier is driven upwardly held within the channel members to allow all of the cows to exit at once from the milking stalls, whereafter the barrier is lowered back to its blocking position.

16 Claims, 5 Drawing Sheets

BRISKET BAR APPARATUS FOR CONTROLLING THE POSITIONING AND MOVEMENT OF COWS IN A MILKING PARLOR

FIELD OF THE INVENTION

This invention pertains generally to the field of milking equipment and cattle handling equipment and particularly to automated milking parlors.

BACKGROUND OF THE INVENTION

Various configurations have been developed for milking parlors. In a typical modern milking parlor, several cows are milked simultaneously utilizing various types of automated equipment, particularly automated milking claw detachers. Among the configurations for milking parlors is the so called herringbone arrangement in which several cows are led into the milking parlor at the same time and are lined up at a diagonal to the length of the milking parlor, with the rear of the cow facing the milking parlor pit where an attendant can reach the udder of each cow and attach the teat cups.

To cause the cows to be properly aligned in the herringbone parlor configuration, the cows are generally led into the parlor in single file adjacent to the milking machines, with the first cow being urged into the proper diagonal position by an exit gate which, in its closed position, extends at a diagonal to the lengthwise direction of the milking parlor. To constrain the cows as they enter the milking stalls and to cause the cows following the first cow to assume the diagonal position, a restraining structure such as a fence or bar is mounted along the length of the milking stations in the parlor at a distance away from the milking stations which is less than the front leg to back leg length of a cow. When the first cow reaches the exit gate and assumes a diagonal position to the milking stall, the other cows will be forced to do the same, thus causing all to properly line up in the herringbone milking parlor.

In a typical herringbone parlor design, after all the cows have finished milking, the exit gate at the end of the parlor is opened and the cows leave the parlor in single file. However, it has been found that this somewhat slows down the exit of the cows and can result in pushing and shoving between the cows which may further slow down the exit procedure. In addition, the restraining fence or barrier which is parallel to the milking machines is typically formed of metal pipe and occasionally the cows will attempt to the climb over the pipe and get entangled in it.

In some herringbone milking parlor designs, individual exit gates have been built to form the restraining barrier so that each cow can be individually released from the milking stall when it has finished milking. However, such individual exit gates are more expensive and necessarily require more complicated control and operating structures. Another approach to exiting has been to provide an exit barrier parallel to the milking machines which is held in the normal lower position adjacent to the front or "brisket" of the cow during milking but is raised to allow all of the cows to exit at once when all cows have finished milking. By raising the entire barrier in this manner, all the cows can very quickly leave the milking parlor with a minimum of pushing and shoving.

SUMMARY OF THE INVENTION

In accordance with the present invention, a brisket bar apparatus which controls the positioning and movement of cows in a milking parlor has a brisket bar barrier which is supported along the length of the milking stations of the parlor in proper position to cause the cows to assume the proper herringbone alignment when the cows enter the milking stalls. The brisket bar barrier is preferably formed of sheet metal, such as stainless steel, in a triangular cross sectional configuration, particularly having sloped top and bottoms surfaces, so that the inward peak of the triangle can be oriented against the front or brisket of the cow to urge the cow into its proper position while presenting no firm foothold that a cow can engage with its hoof if it tries to climb over the barrier.

The brisket bar barrier is supported so that it can be held at its normal position engaging the brisket of the cow during the normal milking operation and then, when milking is completed, be raised to a height above the head of the cows so that all the cows may exit unimpeded at once. The brisket bar barrier is preferably supported by vertical posts at widely spaced positions so that the barrier spans an unimpeded space which will allow quick and unimpeded exit by the cows when the barrier is raised. The barrier is also preferably mounted for selective inward motion when it is at its lower blocking position. When the cows enter the milking stalls, the brisket bar barrier is preferably set at its lower blocking position and at its outward position allowing a relatively wide space between the milking machines and the barrier. After all the cows are in their milking stalls, the barrier may then be selectively moved inwardly a short distance to force the cows to line up more closely together and in proper alignment with the milking machines. By crowding the cows in this manner, they will be more restrained from movement and less likely to move around in the milking parlor in a manner which could disrupt the milking operation. The brisket bar barrier would ordinarily be drawn back to its outmost position before being raised to allow exit of the cows.

In a preferred structure for supporting the brisket bar barrier, elongated swinging channel members are pivotally mounted toward one end to a position near the top of the posts so that they can swing about a horizontal axis at the pivots. The channel members preferably define an open channel along the length thereof which faces inwardly. The brisket bar barrier extends between the channel members and includes means on the ends of the barrier for mounting to each channel member to provide sliding upward and downward movement of the barrier in the channels. The raising and lowering of the brisket bar barrier is controlled by a single drive cylinder, such as an air cylinder, which drives a piston rod to which is connected two cables. Each of the cables extend around pulleys mounted at the ends of the brisket bar barrier and then upwardly through the channel members to the top of the channel members where the cables are secured. When the drive cylinder drives its piston rod outwardly, each of the cables is drawn into the brisket bar barrier an equal amount to draw both ends of the barrier upwardly within the two channel members in which the barrier slides. Extension drive cylinders are also mounted to each of the support posts and have an extending piston rod which engages an abutment plate attached to the swinging channel members. In the normal withdrawn position of the extension cylinders, the brisket bar barrier is at its outwardmost position. When the two extension drive cylinders drive their piston rods outwardly, the channel members swing inwardly about their pivot mountings to move the brisket bar barrier inwardly. The brisket bar barrier returns to its normal position when the pressure in the air cylinders is released.

The positioning and movement of the brisket bar barrier can be coordinated with the entrance and exiting of the cows, including signals determining the end of milking of all of the cows, to control the entrance and exit of the cows in an automatic and coordinated manner.

Further objects, features and advantages of the invention will be apparent from the following detailed description when taken in conjunction with the accompanying drawings.

DETAILED DESCRIPTION OF THE INVENTION

Figure 1:
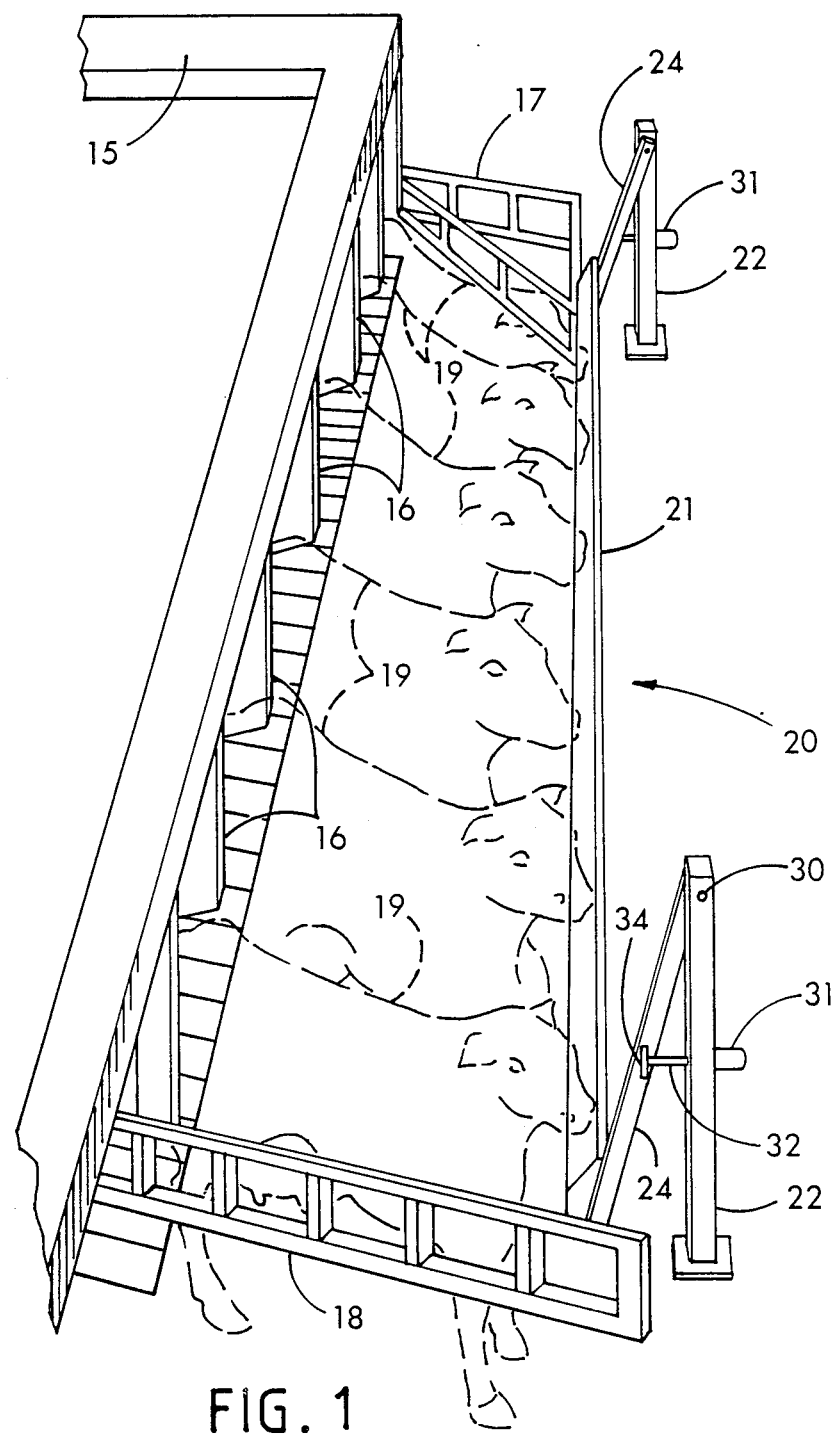
FIG. 1 is a simplified perspective view of an illustrative herringbone type milking parlor showing the brisket bar apparatus of the present invention.

With reference to the drawings, one side of a herringbone milking parlor is shown generally at 15 in FIG. 1 in a schematic fashion, with the individual milking machines or stations indicated generally at 16. The milking parlor has an entrance gate illustrated generally at 17 and an exit gate illustrated at 18. The milking equipment 16 may be of various types, typically including automatic detachers and other ancillary equipment. The position of a few of the cows that would occupy the parlor are illustrated schematically by the dashed lines labeled 19 in FIG. 1.

The brisket bar apparatus of the present invention is illustrated generally at 20 in FIG. 1 and includes a brisket bar barrier 21, vertical support posts 22 at the ends of the brisket bar barrier which are secured in the floor of the milking parlor, and swinging channel members 24 which are pivotally mounted at one end near their tops to the support posts 22. The brisket bar barrier 21 is mounted to the swinging channel members 24 to slide upwardly and downwardly in the channel members, as described further below. The brisket bar barrier 21 is shown in FIG. 1 in its inward-most blocking position, providing maximum restraint to the cows and urging them to their proper diagonal position during the milking operation.

Figure 2:
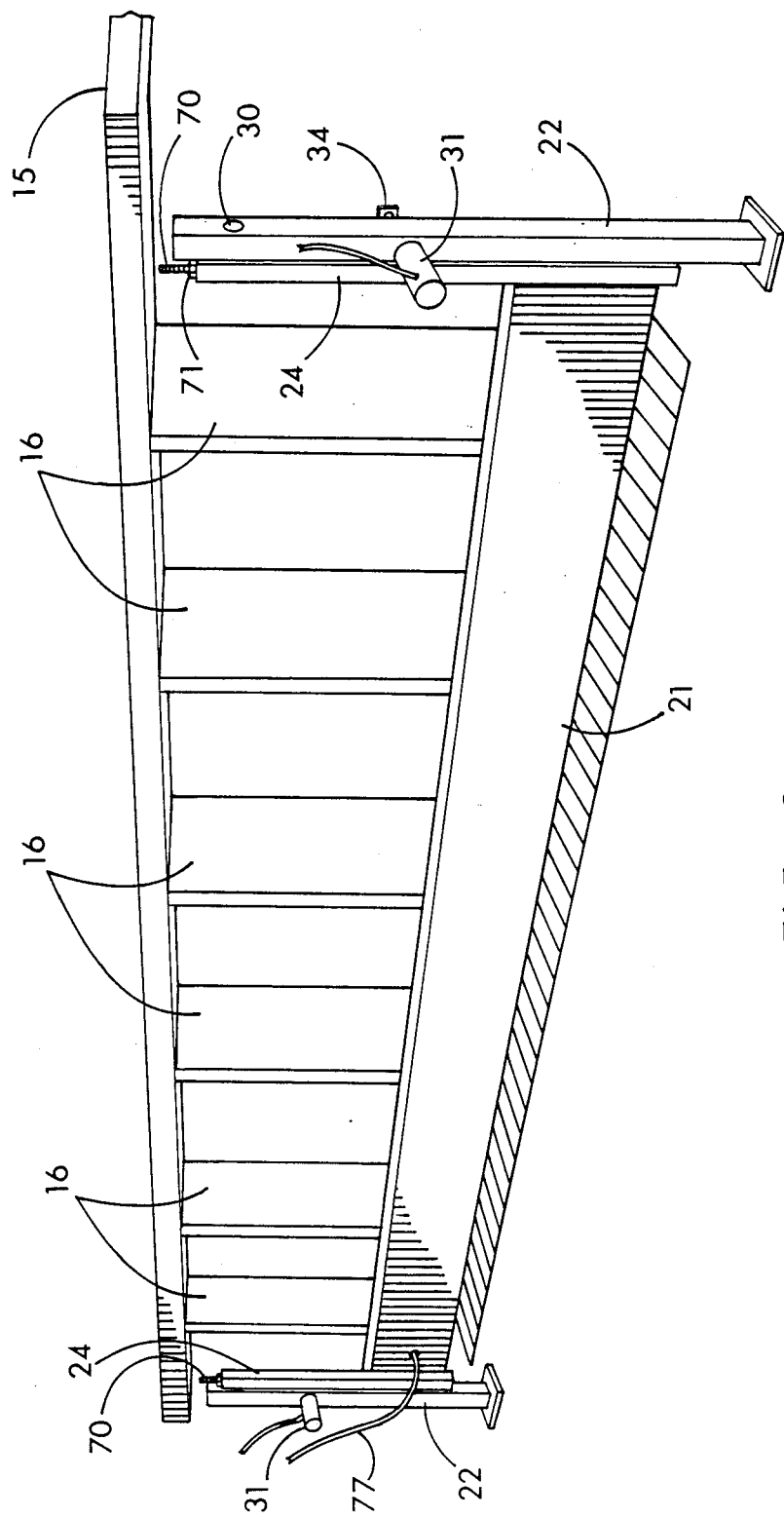
FIG. 2 is another view of a milking parlor showing the brisket bar apparatus of the invention with the brisket bar barrier in its lower blocking position and in its outwardly relaxed position.

The perspective view of FIG. 2 shows the brisket bar barrier 21 in its downward blocking position and withdrawn to its outermost position which it would be in when cows enter the milking stalls through the open entrance gate 17.

Figure 3:
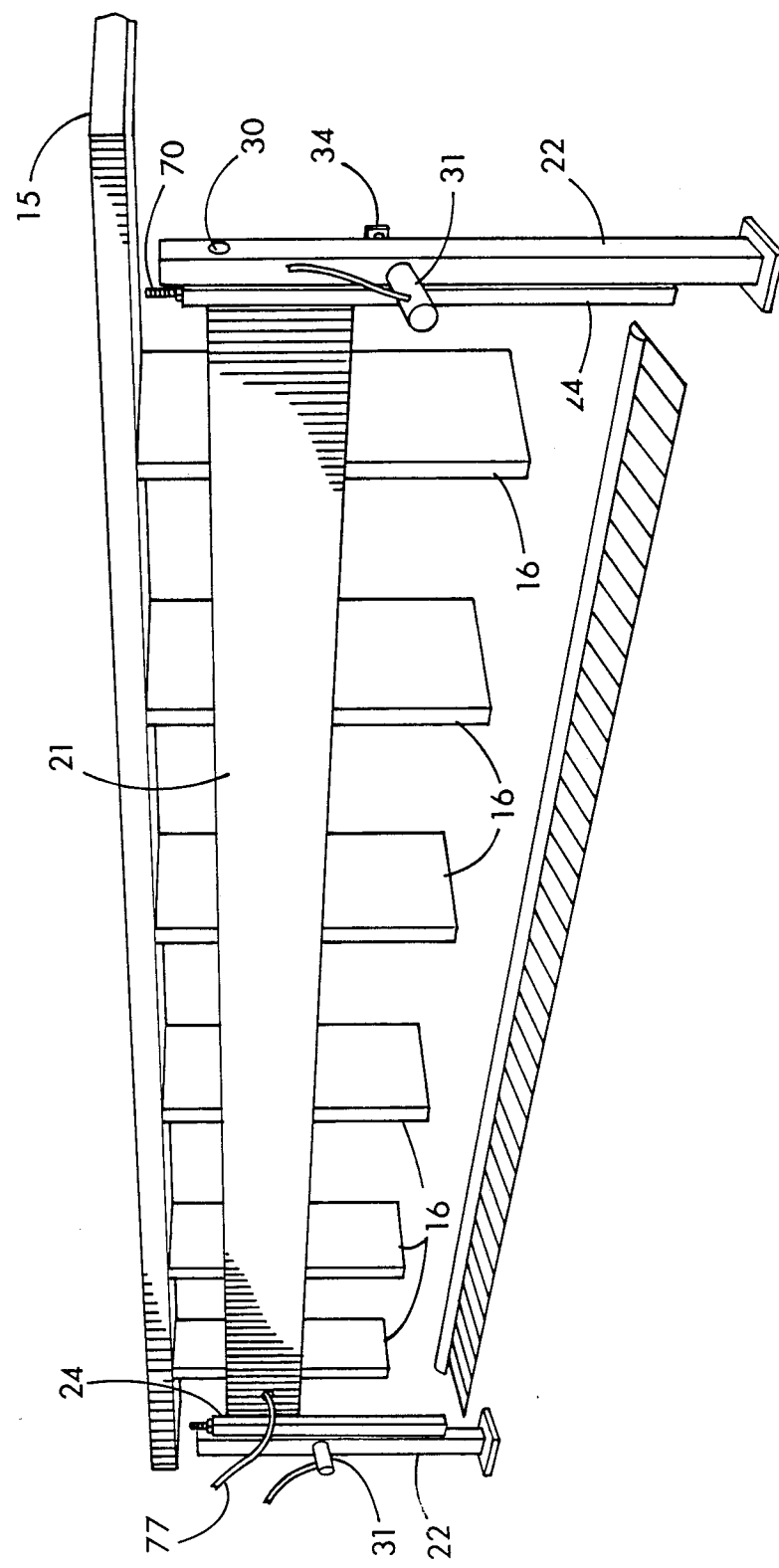
FIG. 3 is a perspective view of a milking parlor with the brisket bar barrier raised to its exit position.

FIG. 3 shows the brisket bar barrier 21 in its fully raised position allowing the cows to exit as a group from the milking parlor. The barrier 21 ordinarily would be raised after all of the cows in the group have completed milking and the teat cups have been detached from each of the cows. The raising of the barrier 21 may be automatically controlled to occur a selected period of time after the milking claw detachers have determined that each cow has milked out and the claws have been detached from the cows. The brisket bar 21 would then be raised for a selected period of time during which all of the cows would exit from the milking stall, after which the barrier would automatically be lowered to await entry of the next group of cows.

Figure 4:
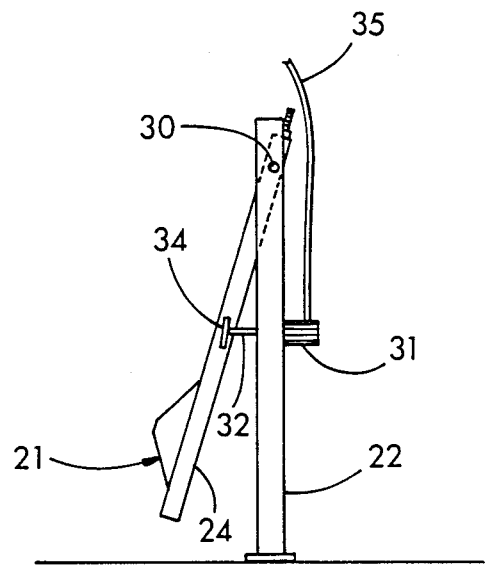
FIG. 4 is a side view of the brisket bar apparatus showing the brisket bar barrier extended to its inward most position.

FIG. 4 shows a side elevational view of the brisket bar apparatus of the invention with the brisket bar barrier 21 in its lower most or blocking position and also advanced to its inward most position. The channel members 24 are pivotally attached to the support posts 22 by pivots 30, at a position near the top of the channels 24. The swinging channels 24 and the brisket bar barrier 21 are driven inwardly and outwardly by extension air cylinders 31 (one shown in FIG. 4) which are controlled to drive the piston rod or plunger 32 of the air cylinder outwardly to engage an abutment plate 34 which is attached to each of the swinging channel members 24. Air under pressure is selectively supplied to the cylinders 31 through air hoses 35. The plunger 32 of the air cylinder 31 is shown in its fully advanced position in FIG. 4, driving the swinging channel members 24 and the barrier 21 to swing forwardly to the inward-most position of the barrier.

Figure 5:
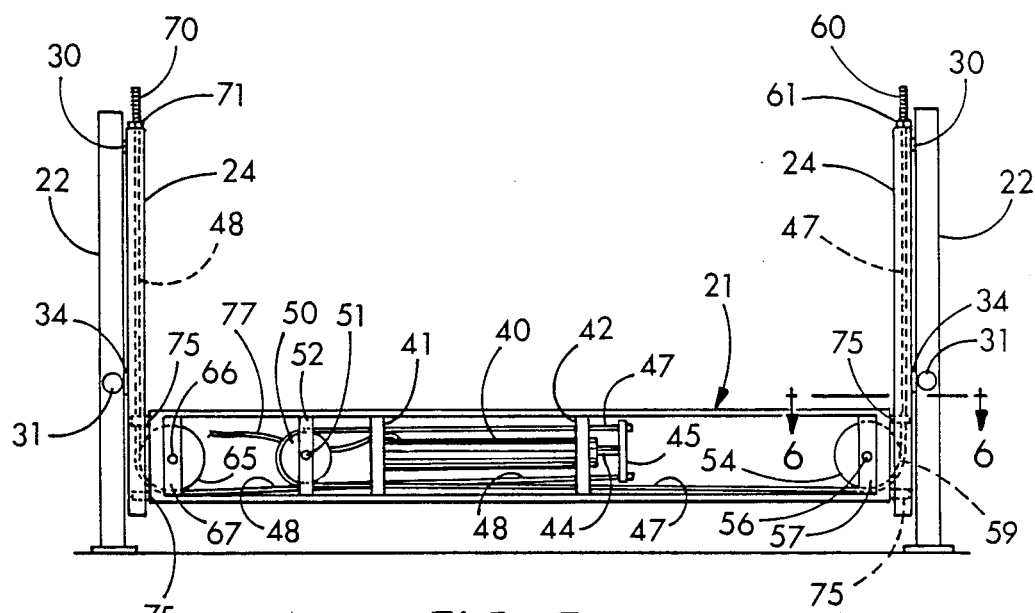
FIG. 5 is a back elevation view of the brisket bar apparatus of the present invention with the back cover plate of the brisket bar barrier removed to show the drive cylinder and pullies which control the raising and lowering of the brisket bar barrier.

A back view of the brisket bar apparatus of the present invention is shown in FIG. 5 with the back plate of the brisket bar barrier removed to illustrate the lift operating mechanism of the apparatus. Mounted within the barrier 21 is an air drive cylinder 40 which is attached at each end by support straps 41 and 42 to the structural framework of the brisket bar barrier 21. The piston rod 44 of the cylinder 40 extends to a clevis 45 to which are attached two flexible, preferably steel wire cables 47 and 48. The cable 47 extends backwardly around a redirection pulley 50 which is pivotally attached by a bearing 51 to a support brace 52 which is attached to the framework of the brisket bar barrier 21. The cable 47 extends around the pulley 50 backwardly toward the other end of the barrier where it is engaged over a pulley 54 which is mounted by a bearing 56 to a support brace 57 which is attached to the framework of the barrier. The pulley is mounted to the barrier such that a portion of the pulley, designated 59 in FIG. 5, extends outwardly beyond the outer-most edge of the barrier 21 and into the channel (not shown in FIG. 5) of the adjacent channel member 24. As shown by the dashed lines labeled 47 in FIG. 5, the cable 47 extends upwardly through the channel to the top of the channel member 24 where it is attached to a threaded stud 60 which is threaded into an adjustment nut 61 mounted to the top of the channel member 24.

The second cable 48 extends around a pulley 65 which is mounted to a bearing 66 attached to a brace 67 which is attached to the frame of the barrier 21. In a manner similar to the pulley 54, the pulley 65 extends outwardly from the end of the barrier 21 and into the interior channel of the adjacent channel member 24, and the cable 48 extends upwardly in the channel in the member 24 to attachment to a threaded stud 70 which threads through an adjustment nut 71 which is attached to the top of the channel member 24.

In the lower-most or blocking position of the brisket bar barrier 21 shown in FIG. 5, the piston 44 of the air drive cylinder 40 is in its innermost or relaxed position, dropping the barrier down toward the bottom end of the swinging channel members 24. The ends of the brisket bar are held in place in the channels within the two channel members 24 by guide blocks 75, preferably made of a low friction material, which are attached to the ends of the brisket bar 21 and extend into the channels in the two channel members 24. The guide blocks 75 are shown in dashed lines in FIG. 5 as these extend into the channels of the channel members 24.

When the brisket bar barrier 21 is to be raised, air is supplied under pressure through an air hose 77 to one end of the air cylinder 40, driving the piston (not shown) within the air cylinder 40 outwardly, forcing the piston rod 44 and the clevis 45 outwardly, and thereby drawing the cables 47 and 48 inwardly into the brisket bar barrier and drawing the barrier 21 upwardly with the guide blocks 75 sliding within the channels of the two channel members 24. Because the cables 47 and 48 are attached to a single air cylinder and are thus drawn inwardly into the brisket bar an exactly equal amount as the clevis 45 of the air cylinder is pushed outwardly, both ends of the brisket bar 21 will necessarily be raised by exactly the same distance and at the same rate. The lower-most or blocking position of the brisket bar barrier is preferably set so that the barrier 21 is at a height which will cause the barrier to just engage the brisket of the cow and so that the cow's head can extend out over the barrier 21. Typically, the bottom edge of the brisket bar barrier 21 may be twenty inches from the floor, although with different breeds of cattle and various designs for milking parlors, it is often desirable to allow the height of the brisket bar in its lower-most position to be adjusted. To allow adjustment of the lower or blocking position of the brisket bar barrier, rotation of the adjustment nuts 71 and 61 results in the threaded studs 60 and 70 being raised or lowered, thereby raising or lowering the attachment position of the cables 47 and 48 to the studs 60 and 70, and thereby raising or lowering the lower-most position of the brisket bar barrier 21 by a selected amount.

Figure 6:
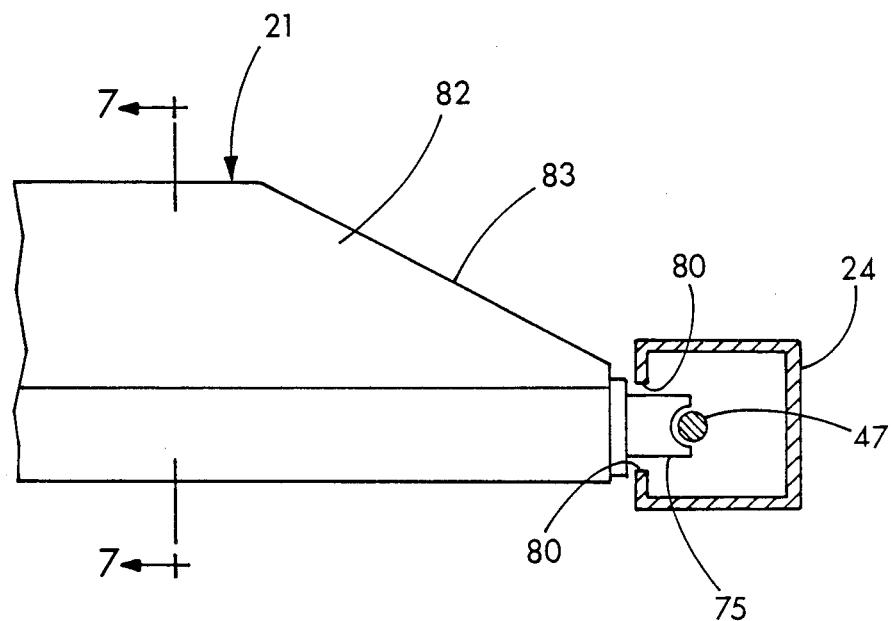
FIG. 6 is a cross-sectional view through the brisket bar apparatus taken along the lines 6—6 of FIG. 5.

A cross-sectional view through one of the swinging channel members 24 just above the brisket bar barrier 21 is shown in FIG. 6. As is illustrated therein, a channel within the channel members 24 is defined by the inner edges 80 of the sheet metal forming the channel member 24, with the edges 80 being spaced closely adjacent to the outer surfaces of the guide blocks 75. The guide blocks 75 are preferably formed of a hard, durable and relatively low friction plastic material so that they will slide readily within the channel in the member 24. As is also shown in FIG. 6, the portion of the brisket bar barrier 21 facing the cows preferably has a triangularly shaped front surface 82 which terminates at each end of the barrier in a sloped section 83 so that the barrier presents substantially no sharp corners to the cows.

Figure 7:
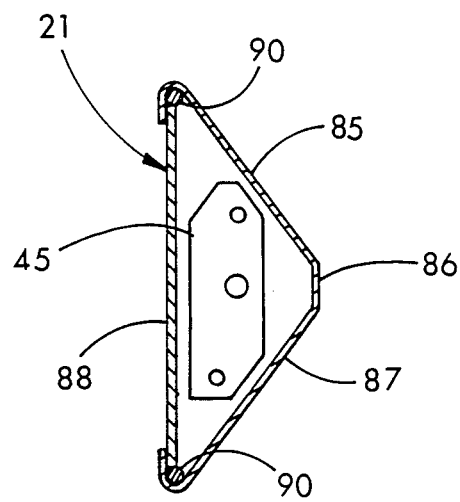
FIG. 7 is a cross-sectional view through the brisket bar barrier taken generally along the lines 7—7 of FIG. 6.

A cross section through the brisket bar barrier is shown in FIG. 7, illustrating the substantially triangular inner facing shape of the brisket bar, having a downwardly and inwardly sloping side 85, a small flat center section 86, an outwardly sloping bottom side 87 and a flat back plate 88, all formed of smooth sheet metal such as stainless steel. To provide structural reinforcement, solid steel bars 90 may be welded to the top and bottom of the brisket bar barrier.

It is understood that the invention is not confined to the particular construction and arrangement of parts illustrated herein, but embraces all such modified forms thereof as come within the scope of the following claims.

What is claimed is:

1. Apparatus for controlling the positioning and movement of cows in a herringbone milking parlor having a plurality of milking stations in a row, with the cows oriented in a diagonal orientation with respect to the row of stations, comprising:
   (a) an elongated brisket bar barrier extending along the length of the row of milking stations spaced away from the stations a distance sufficient to hold the cows in their diagonal orientation with respect to the stations, the brisket bar barrier formed of smooth sheet metal and having a cross section on the face of the brisket bar apparatus presented to the cows of sloping top and bottom surfaces, thereby presenting substantially no sharp corners or edges to the cows; and
   (b) support means for supporting the brisket bar barrier in a lower blocking position at which the face presented to the cows is substantially at the height of the brisket of the cows, and for raising the brisket bar barrier to an elevation above the heads of the cows to allow the cows to exit and then returning the barrier back down to the lower blocking position.

2. The apparatus of claim 1 including means for selectively driving the brisket bar barrier a selected distance inwardly toward the cows when the barrier is in its lower blocking position to thereby urge the cows to proper alignment.

3. The apparatus of claim 1 wherein the support means includes a pair of vertical support posts positioned at and adjacent to the ends of the brisket bar barrier; swinging channel members pivotally mounted to each of the support posts at a position near the top of the post to swing about a horizontal axis, the channel members being formed to define an open channel along their lengths which faces inwardly toward the ends of the brisket bar barrier; means for mounting the brisket bar barrier to the channel members for sliding upward and downward movement of the brisket bar barrier held in the channel members; and drive means mounted to the brisket bar barrier for driving the brisket bar barrier upwardly and downwardly in the channels, including a drive cylinder with a piston rod and two cables extending from connection to the piston rod in opposite directions along the brisket bar barrier up and into the channels of the channel members to the top of the channel members where each cable is secured to the top of its respective channel member such that movement of the piston rod draws the brisket bar barrier upwardly to raise the brisket bar barrier to its elevated position.

4. The apparatus of claim 3 wherein the drive means further includes two pulleys mounted at opposite ends of the brisket bar barrier to extend outwardly beyond each end of the brisket bar barrier a short distance and into the channel of the adjacent channel member, a redirection pulley mounted for rotation within the brisket bar barrier, one of the cables extending from its connection to the piston rod around the redirection pulley and thence to one of the pulleys at the end of the brisket bar, and the other cable extending from its connection to the piston rod to the other pulley.

5. The apparatus of claim 3 wherein the drive cylinder is an air cylinder which is operated by being supplied with air under pressure.

6. The apparatus of claim 3 wherein the ends of the cables are secured to the channel members utilizing a threaded stud to which the end of each cable is connected and an adjustment nut which can be turned to adjust the vertical height of the threaded stud and therefore the vertical height of the point of attachment of the cables, thereby adjusting the vertical height of the brisket bar barrier above the ground when the brisket bar barrier is in its lower-most position.

7. The apparatus of claim 2 wherein the means for driving the brisket bar barrier inwardly and outwardly comprises a pair of air cylinders having extending piston rods, one each of the air cylinders being mounted to one of the support posts and an abutment plate on each of the channel members extending outwardly to a position where it can engaged by the end of the piston rod of the air cylinder on the adjacent support post, such that when the air cylinders are supplied with air under pressure, the piston rods of the air cylinders are advanced outwardly to engage the abutment plates and to drive the swinging channel members and the brisket bar barrier to swing inwardly toward the cows in the milking stalls.

8. The apparatus of claim 3 wherein the means for mounting the brisket bar barrier to the channel members for upward and downward movement includes sliding blocks extending outwardly from the ends of the brisket bar barrier and fitting within the channels of the swinging channel members to allow the brisket bar barrier to slide freely upwardly and downwardly but restraining the brisket bar barrier from moving away from the swinging channel members.

9. Apparatus for controlling the positioning and movement of cows in a herringbone milking parlor having a plurality of milking stations in a row, with the cows oriented in a diagonal orientation with respect to the row of stations, comprising:

(a) an elongated brisket bar barrier extending along the length of the row of milking stations spaced away from the stations a distance sufficient to hold the cows in their diagonal orientation with respect to the stations; and (b) support means for supporting the brisket bar barrier in a lower blocking position at which the face presented to the cows is substantially at the height of the brisket of the cows, and for raising the brisket bar barrier to an elevation above the heads of the cows to allow the cows to exit and then returning the barrier back down to the lower blocking position, including a pair of vertical support posts positioned at and adjacent to the ends of the brisket bar barrier; swinging channel members pivotally mounted to each of the support posts at a position near the top of the post to swing about a horizontal axis, the channel members being formed to define an open channel along their lengths which faces inwardly toward the ends of the brisket bar barrier; means for mounting the brisket bar barrier to the channel members for sliding upward and downward movement of the brisket bar barrier held in the channel members; and drive means mounted to the brisket bar barrier for driving the brisket bar barrier upwardly and downwardly in the channels, including a drive cylinder with a piston rod and two cables extending from connection to the piston rod in opposite directions along the brisket bar barrier up and into the channels of the channel members to the top of the channel members where each cable is secured to the top of its respective channel member such that movement of the piston rod draws the brisket bar barrier upwardly to raise the brisket bar barrier to its elevated position.

10. The apparatus of claim 9 including means for selectively driving the brisket bar barrier a selected distance inwardly toward the cows when the barrier is in its lower blocking position to thereby urge the cows to proper alignment.

11. The apparatus of claim 9 wherein the brisket bar barrier is formed of smooth sheet metal and has a cross section on the face of the brisket bar apparatus presented to the cows of sloping top and bottom surfaces, thereby presenting substantially no sharp corners or edges to the cows.

12. The apparatus of claim 9 wherein the drive means further includes two pulleys mounted at opposite ends of the brisket bar barrier to extend outwardly beyond each end of the brisket bar barrier a short distance and into the channel of the adjacent channel member, a redirection pulley mounted for rotation within the brisket bar barrier, one of the cables extending from its connection to the piston rod around the redirection pulley and thence to one of the pulleys at the end of the brisket bar, and the other cable extending from its connection to the piston rod to the other pulley.

13. The apparatus of claim 9 wherein the drive cylinder is an air cylinder which is operated by being supplied with air under pressure.

14. The apparatus of claim 9 wherein the ends of the cables are secured to the channel members utilizing a threaded stud to which the end of each cable is connected and an adjustment nut which can be turned to adjust the vertical height of the threaded stud and therefore the vertical height of the point of attachment of the cables, thereby adjusting the vertical height of the brisket bar barrier above the ground when the brisket bar barrier is in its lower most position.

15. The apparatus of claim 10 wherein the means driving the brisket bar barrier inwardly and outwardly comprises a pair of air cylinders having extending piston rods, one each of the air cylinders being mounted to one of the support posts and an abutment plate on each of the channel members extending outwardly to a position where it can engaged by the end of the piston rod of the air cylinder on the adjacent support post, such that when the air cylinders are supplied with air under pressure, the piston rods of the air cylinders are advanced outwardly to engage the abutment plates and to drive the swinging channel members and the brisket bar barrier to swing inwardly toward the cows in the milking stalls.

16. The apparatus of claim 9 wherein the means for mounting the brisket bar barrier to the channel members for upward and downward movement includes sliding blocks extending outwardly from the ends of the brisket bar barrier and fitting within the channels of the swinging channel members to allow the brisket bar barrier to slide freely upwardly and downwardly but restraining the brisket bar barrier from moving away from the swinging channel members.

* * * * *